United States Patent
Liu et al.

(10) Patent No.: US 11,599,823 B2
(45) Date of Patent: Mar. 7, 2023

(54) QUANTUM REINFORCEMENT LEARNING AGENT

(71) Applicant: International Business Machines Corporation, Armonk, NY (US)

(72) Inventors: Peng Liu, Yorktown Heights, NY (US); Shaohan Hu, Yorktown Heights, NY (US); Stephen Wood, Thornwood, NY (US); Marco Pistoia, Amawalk, NY (US); Arthur Giuseppe Rattew, St. Louis, MO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 808 days.

(21) Appl. No.: 16/540,721

(22) Filed: Aug. 14, 2019

(65) Prior Publication Data
US 2021/0049498 A1 Feb. 18, 2021

(51) Int. Cl.
*G06N 20/00* (2019.01)
*G06N 7/00* (2006.01)
*G06N 10/00* (2022.01)

(52) U.S. Cl.
CPC ............ *G06N 20/00* (2019.01); *G06N 7/005* (2013.01); *G06N 10/00* (2019.01)

(58) Field of Classification Search
CPC ........ G06N 20/00; G06N 7/005; G06N 10/00; G06N 3/006
See application file for complete search history.

(56) References Cited

U.S. PATENT DOCUMENTS

| | | | | |
|---|---|---|---|---|
| 2020/0118025 | A1* | 4/2020 | Romero | G06N 3/088 |
| 2020/0342345 | A1* | 10/2020 | Farhi | G06N 3/063 |
| 2022/0107927 | A1* | 4/2022 | Vedaie | G06F 16/22 |

FOREIGN PATENT DOCUMENTS

WO WO-2020263146 A1 * 12/2020 ............. G06N 10/00

OTHER PUBLICATIONS

Crawford, et al. "Reinforcement Learning Using Quantum Boltzman Machines." arXiv:1612.05695v3 [quant-ph] Jan. 3, 2019. 25 pages.
Dunjko, et al. "Advances in Quantum Reinforcement Learning." arXiv:1811.08676v1 [quant-ph] Nov. 21, 2018; 6 pages.
(Continued)

*Primary Examiner* — Mohammad W Reza
(74) *Attorney, Agent, or Firm* — Amin, Turocy & Watson, LLP

(57) ABSTRACT

Systems, computer-implemented methods, and computer program products that can facilitate applying a reinforcement learning policy to available actions are described. According to an embodiment, a system can comprise a memory that stores computer executable components and a processor that executes the computer executable components stored in the memory. The computer executable components can comprise a state encoder that maps, based on one or more encoding parameters, a state of an environment on to one or more qubits of a quantum device. The system can further comprise a variational component that combines a reinforcement learning policy with a sampling of the one or more qubits, resulting, based on one or more variational parameters, in a probability distribution of a plurality of available actions at the state of the environment.

6 Claims, 12 Drawing Sheets

(56) References Cited

OTHER PUBLICATIONS

Mitarai, et al. "Quantum Circuit Learning." arXiv:1803.00745v3 [quant-ph] Apr. 24, 2019. 7 pages.
Havlicek, et al. "Supervised learning with quantum enhanced feature spaces." arXiv:1804.11326v2 [quant-ph] Jun. 5, 2018. 22 pages.
Dong, et al. "Quantum Reinforcement Learning." arXiv:0810.3828v1 [quant-ph] Oct. 21, 2008. 13 pages.
Mell, Peter, et al. "The NIST Definition of Cloud Computing." National Institute of Standards and Technology. Sep. 2011. 7 pages.

* cited by examiner

QUANTUM REINFORCEMENT LEARNING AGENT

BACKGROUND

The subject disclosure relates to artificial intelligence, and more specifically, to reinforcement learning.

SUMMARY

The following presents a summary to provide a basic understanding of one or more embodiments of the present disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, and/or computer program products that can facilitate quantum reinforcement learning are described.

According to an embodiment, a system can comprise a memory that stores computer executable components and a processor that executes the computer executable components stored in the memory. The computer executable components can comprise a state encoder that maps, based on one or more encoding parameters, a state of an environment on to one or more qubits of a quantum device. The system can further comprise a variational component that combines a reinforcement learning policy with a sampling of the one or more qubits, resulting, based on one or more variational parameters, in a probability distribution of a plurality of available actions at the state of the environment.

According to another embodiment, a computer-implemented method can comprise encoding, by a system operatively coupled to a processor, based on one or more encoding parameters, a state of an environment to span a plurality of qubits of a quantum device, resulting in a stored quantum state representation of the environment. The method can further comprise classifying, by the system, based on one or more classifying parameters, the stored quantum state representation of the environment based on a sampling of one or more of the plurality of qubits, resulting in a classified state of the environment.

According to another embodiment, a computer program product can facilitate selecting an action based on a quantum reinforcement learning policy. The computer program product can comprise a computer readable storage medium having program instructions embodied therewith, the program instructions can be executable by a processor to cause the processor to map, by the processor, based on one or more encoding parameters, a state of an environment on to one or more qubits of a quantum device. The program instructions further cause the processor to combine, by the processor, a reinforcement learning policy with a sampling of the one or more qubits, resulting, based on one or more variational parameters, in a probability distribution of a plurality of available actions at the state of the environment. The program instructions further cause the processor to select, by the processor, an action of the plurality of available actions based on the probability distribution, resulting in a selected action.

DETAILED DESCRIPTION

Figure 1:
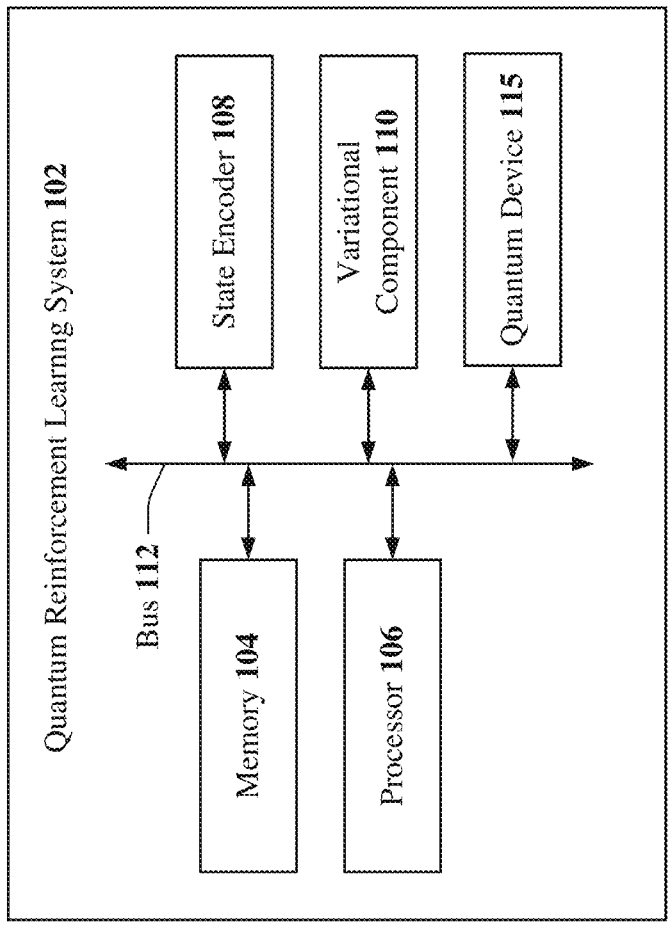
FIG. 1 illustrates a block diagram of an example, non-limiting system that can facilitate quantum reinforcement learning, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Quantum computing is generally the use of quantum-mechanical phenomena for the purpose of performing computing and information processing functions, e.g., quantum computing can employ quantum physics to encode and process information, rather than binary digital techniques based on transistors. That is, while classical computers can operate on bit values that are either 0 or 1, quantum computers operate on quantum bits that (qubits) that can comprise superpositions of both 0 and 1, can entangle multiple quantum bits (qubits), and use interference to affect other qubits. Quantum computing has the potential to solve problems that, due to their computational complexity, cannot be solved, either at all or for all practical purposes, by a classical computer.

The superposition principle of quantum physics can facilitate allowing qubits to be in a state that partially represent both a value of "1" and a value of "0" at the same time. The entanglement principle of quantum physics can facilitate allowing qubits to be correlated with each other such that the combined states of the qubits cannot be factored into individual qubit states. For instance, a state of a first qubit can depend on a state of a second qubit. As such, a quantum circuit can employ qubits to encode and process information in a manner that can be significantly different from binary digital techniques based on transistors.

Reinforcement learning is type of machine learning where a computer-enabled agent (an automated actor in an environment) learns through interactions with an environment, rather than learning from data. A reinforcement learning agent takes the action a at a given state s with a probability according to its policy, π, as expressed by π(s, a)=p(a|s). An agent may operate in an environment where its state is described by continuous variables (as opposed to an environment such as a building with a closed floor plan, where the agent has to be in one of a discrete, finite number of positions). Based at least on this reinforcement learning based on continuous variables, one or more embodiments can have applications in various industries, from robotics to logistics.

For example, performing reinforcement learning in continuous state spaces can require continuous parameters to characterize them. Many applications, such as robotics, use reinforcement learning algorithms to control agents in continuous state spaces. In reinforcement learning, the agent learns exclusively through interactions with its environment (unlike other machine learning models where the agent learns from training data). Consequently, the rate at which an agent can learn is clearly of significance. For example, if a robot is trying to learn how to navigate through a building in a disaster relief effort, it is imperative that the agent learns how to do so as quickly as possible.

At least two embodiments are described herein, the first being an approach where there can be one qubit per continuous state parameter describing the state space. Additionally, an action can be determined via the sampling of a subset of the qubits in the circuit. Specifically, in this first implementation, where there are m actions to choose from, then the number of qubits measured to select an action is log m. As described below, this and other embodiments described herein can provide significant improvements in learning rates, e.g., the number of episodes required to learn an optimal policy.

In another embodiment, described in FIG. 8 below, for p continuous state parameters describing the state space, there can be n=$\log_2 p$ qubits in the circuit. Additionally, the action is selected via the use of an additional mapping transformation at the end of the circuit. Among other benefits, as described with FIG. 8 below, among other benefits, this embodiment can increase the utility of quantum reinforcement learning algorithms for quantum hardware in the noisy intermediate scale quantum (NISQ) era, not only for continuous state space reinforcement learning applications, but also in general.

The data illustrated in FIG. 7 and described below provides a numerical example that supports the findings of the various embodiments of the subject disclosure.

FIG. 1 illustrates a block diagram of an example, non-limiting system 100 that can facilitate quantum reinforcement learning in accordance with one or more embodiments described herein.

In some embodiments, system 100 can comprise a quantum reinforcement learning system 102. In some embodiments, quantum reinforcement learning system 102 can comprise state encoder 108, variational component 110, quantum device 115, and any other components associated with quantum reinforcement learning system 102 as disclosed herein.

According to multiple embodiments, quantum device 115 can comprise one or more quantum devices including, but not limited to, a quantum computer, a quantum processor, a quantum simulator, quantum hardware, a quantum chip (e.g., a superconducting circuit fabricated on a semiconducting device), one or more qubits of a quantum chip, and/or another quantum device.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or quantum reinforcement learning system 102 can further comprise various computer and/or computing-based elements described herein with reference to operating environment 1200 and FIG. 12. For example, in some embodiments, quantum reinforcement learning system 102 can further comprise memory 104, processor 106, and/or bus 112. In several embodiments, such computer and/or computing-based elements can be used in connection with implementing one or more of the systems, devices, components, and/or computer-implemented operations shown and described in connection with FIG. 1 or other figures disclosed herein.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

According to multiple embodiments, memory 104 can store one or more computer and/or machine readable, writable, and/or executable components and/or instructions that, when executed by processor 106, can facilitate performance of operations defined by the executable component(s) and instruction(s). For example, memory 104 can store computer and otherwise machine readable, writable, and/or executable components and/or instructions that, when executed by processor 106, can facilitate execution of the various functions described herein relating to quantum reinforcement learning system 102, state encoder 108, variational component 110, and any other components associated with quantum reinforcement learning system 102 as described herein, with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), erasable programmable ROM (EPROM), electrically erasable programmable ROM (EEPROM), etc.) that can employ one or more memory architectures. Further examples of memory 104 are described below with reference to system memory 1216 and FIG. 12. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or a combination of different central processing units, multi-core processors, microprocessors, dual microprocessors, microcontrollers, Systems on a Chip (SOC), array processors, vector processors, and any other type of processor. Further examples of processor 106 are described below with reference to processing unit 1214 and FIG. 12. Such examples of processor 106 can be employed to implement any embodiments of the subject disclosure.

In some embodiments, elements of quantum reinforcement learning system 102, including, but not limited to memory 104, processor 106, state encoder 108, variational component 110, and/or another component of quantum reinforcement learning system 102 as described herein, can be communicatively, electrically, and/or operatively coupled to one another via bus 112 to perform functions of system 100, quantum reinforcement learning system 102, and any other components coupled therewith. In several embodiments, bus 112 can comprise one or more of a memory bus, memory controller, peripheral bus, external bus, local bus, or another type of bus that can employ various bus architectures. Further examples of bus 112 are described below with reference to system bus 1218 and FIG. 12. Such examples of bus 112 can be employed to implement any embodiments of the subject disclosure.

In some embodiments, quantum reinforcement learning system 102 can comprise any type of component, machine, device, facility, apparatus, and/or instrument that comprises a processor and/or can be capable of effective and/or operative communication with a wired and/or wireless network. All such embodiments are envisioned. For example, quantum reinforcement learning system 102 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, quantum reinforcement learning system 102 can be coupled (e.g., communicatively, electrically, operatively, etc.) to one or more external systems, sources, and/or devices (e.g., computing devices, communication devices, etc.) via a data cable (e.g., coaxial cable, High-Definition Multimedia Interface (HDMI), recommended standard (RS) 232, Ethernet cable, etc.). In some embodiments, quantum reinforcement learning system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and wireless networks, including, but not limited to, a cellular network, a wide area network (WAN) (e.g., the Internet) or a local area network (LAN). For example, quantum reinforcement learning system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6 LoWPAN (IPv6 over Low power Wireless Area Networks), Z-Wave, an ANT, an ultra-wideband (UWB) standard protocol, and/or other proprietary and non-proprietary communication protocols. In such an example, quantum reinforcement learning system 102 can thus include hardware (e.g., a central processing unit (CPU), a transceiver, a decoder), software (e.g., a set of threads, a set of processes, software in execution) or a combination of hardware and software that facilitates communicating information between quantum reinforcement learning system 102 and external systems, sources, and/or devices (e.g., computing devices, communication devices, etc.).

According to multiple embodiments, quantum reinforcement learning system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with quantum reinforcement learning system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, state encoder 108, variational component 110, and/or any other components associated with quantum reinforcement learning system 102 as disclosed herein (e.g., communicatively, electronically, and/or operatively coupled with and/or employed by quantum reinforcement learning system 102), can comprise such computer and/or machine readable, writable, and/or executable component(s) and/or instruction(s). Consequently, according to numerous embodiments, quantum reinforcement learning system 102 and/or any components associated therewith as disclosed herein, can employ processor 106 to execute such computer and/or machine readable, writable, and/or executable component(s) and/or instruction(s) to facilitate performance of one or more operations described herein with reference to quantum reinforcement learning system 102 and/or any such components associated therewith.

For example, in one or more embodiments, state encoder 108 can facilitate a performance of operations executed by or associated with processor 106 that can facilitate mapping, based on one or more encoding parameters, a state of an environment on to one or more qubits of quantum device 115. Further, variational component 110 can facilitate performance of operations executed by or associated with processor 106 that can facilitate combining a reinforcement learning policy with a sampling of the one or more qubits of quantum device 115, resulting, based on one or more variational parameters, in a probability distribution of a plurality of available actions at the current state of the environment.

In some embodiments, quantum reinforcement learning system 102 can be associated with various technologies. For example, quantum reinforcement learning system 102 can be associated with classical computing technologies, quantum computing technologies, classical reinforcement learning technologies, quantum reinforcement learning technologies, classical artificial intelligence (AI) model technologies, quantum AI model technologies, classical machine learning (ML) model technologies, quantum ML model technologies, cloud computing technologies, Internet-of-Things (IoT) technologies, and/or other technologies.

As noted above, reinforcement learning is a type of machine learning where an agent, as an actor in an environment, can learn through interactions with the environment, rather than learning from training data.

Figure 2:
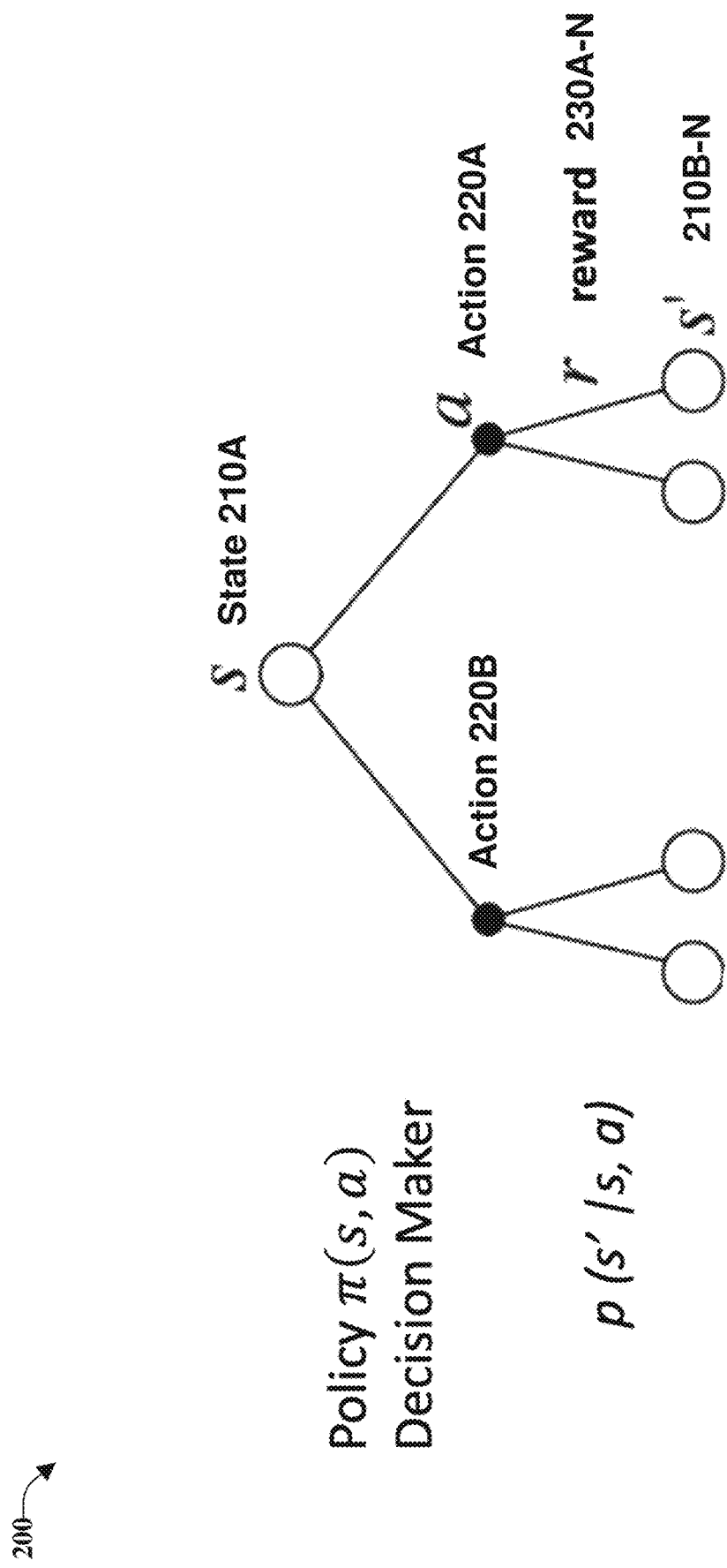
FIG. 2 illustrates a block diagram of an example probability distribution of available actions in furtherance of a policy, in a reinforcement learning system, in accordance with one or more embodiments.

In one or more embodiments, quantum reinforcement learning system 102 can operate as a reinforcement learning agent that interacts with an environment described by continuous variables. Further, in one or more embodiments, reinforcement learning system 102 can learn exclusively through interactions with the environment, e.g., without prior training data provided as required by other types of machine learning processes. Based on this, as discussed further herein, one or more embodiments can have advantages over alternative approaches when a rate at which an agent can learn about an environment is of significance, e.g., as noted above, when a robot is trying to learn how to navigate through a building in a disaster relief effort, it can be important that the agent learns how to do so as quickly as possible, and with as few 'bad' interactions with the environment as possible. FIGS. 2-3 below provide additional details about reinforcement learning generally, and how one or more embodiments can utilize special characteristics of quantum computing to improve many aspects of this approach.

FIG. 2 illustrates a diagram 200 of an example probability distribution of actions available in furtherance of a policy, in a reinforcement learning system, in accordance with one or more embodiments. Repetitive description of like elements and/or processes employed in respective embodiments is omitted for sake of brevity.

As discussed further below, in one type of reinforcement learning, to reinforce the learning process, reinforcement learning system 102, as a computer-enabled reinforcement learning agent, can analyze the state of the environment, and select actions that are designed to, over time, improve the optimality of a policy affecting the state, thus improving a maximization of a cumulative reward.

Diagram 200 expresses a relationship between the value of state 210A and the values of successor states 210B-N and states beyond based on a selection from available actions 220A-B. For example, one approach that can be used by one or more embodiments can select, at state 210A, an action 220A-B that maximizes, according to a policy 250 ($\pi$), not only the short-sighted reward 230, but also the cumulative rewards, according to the policy 250, that can result from the selection of action.

Several related processes can be a part of the processes depicted in FIG. 2, including, but not limited to, maintaining and updating parameters that describe the environment, evaluating rewards of available actions in response to the state, applying an available action based on the evaluations, measuring the results of the applied action, and updating the algorithms used to perform the above processes, so as to increase the rewards of future selected actions. Each of these processes can be performed by one or more components of reinforcement learning system 102, and these components, as well as other related activities are described with the figures and disclosure below, with FIG. 3 depicting selecting an action to apply, FIG. 5 describing the evaluating of results, and FIG. 6 describing the updating of parameters to improve the optimality of the policy implementation.

Returning to a discussion of diagram 200 of FIG. 2, in one or more embodiments, state encoder 108 of quantum reinforcement learning system 102 can maintain state parameters that describe the environment for use by other components. One approach to maintaining the state used by one or more embodiments can employ state encoder 108 to store state parameters using qubits of quantum device 115, e.g., using one qubit per continuous parameter describing the state space. To implement the above approach of diagram 200, state encoder 108 can generate a quantum representation of state 210A.

In an example, state 210A can be relevantly represented by four state parameters and state encoder 108 can encode the value of each state parameter in a qubit, termed a state qubit herein, for convenience. This can be accomplished by one or more embodiments by starting the state qubits in an initial zero state, with qubits initialized to some known value. Based on the state parameters, state encoder 108 can perform quantum circuit transformations that encode the state parameters in the quantum state of the qubit.

In one or more embodiments, the mapping by state encoder 108 can include receiving one or more state parameters corresponding to the state of the environment, and mapping a state parameter of the one or more state parameters on to a qubit of the one or more qubits. Further, state encoder can continuously receive the one or more parameters, and state encoder 108 can continuously map the state parameter of the one or more state parameters on to a qubit of the one or more qubits.

As with other processes of quantum reinforcement learning system 102, and as discussed further below, one or more embodiments of state encoder 108 can utilize quantum-mechanical phenomena to perform operations on the state parameters that would otherwise require processing. For example, using the superposition principle of quantum physics, a value of a state parameter can be stored within a qubit over a continuous range.

Further, with the entanglement principle of quantum physics, state parameters that are interrelated in the environment can be linked during their storage, with a stored parameter able to affect the values of one or more other stored parameters, without the application of processing resources. Examples of this are described below with FIGS. 2-4 and a cart-pole balancing example. For example, during the tipping of a pole from a vertical position, a qubit parameter describing the angle of the pole can be interrelated to a qubit parameter of the velocity at the top of the pole, e.g., based on angular acceleration. An entanglement of these qubits that matches this interrelationship can, among other improvements, facilitate a determination of both parameters with the polling of one of the qubits. One having skill in the relevant art(s), given the description herein, will appreciate different ways that qubit state parameters can be advantageously entangled such that polling subsets of the parameters can provide information about larger portions of the environment state. In alternative implementations, one or more qubits can also store state parameters individually, with or without entanglement. These examples, and other quantum-mechanical phenomena, can be used with one or more embodiments, with some being discussed with examples below.

Turning to a discussion of variational component 110, in one or more embodiments, to evaluate the cumulative rewards 230A-N of available actions 220A-B based on state 210A, variational component 110 can encode a reward-maximizing probability distribution for available actions in one or more qubits. The variational form can be parameterized by a set of parameters ($\theta$), which can implement policy 250 of the reinforcement learning agent. As discussed further with FIG. 6 below, by variationally optimizing ($\theta$) the optimality of the policy in the environment can be increased over time.

After analysis of the available actions based on policy parameters implementing policy 250 and states 210A-B, variational component 110 can output a probability distribution for the available actions maximizing cumulative rewards. One approach to this output can encode the probability distribution on $\log_2 m$ qubits, where m represents the number of available actions, e.g., for the two example available actions, the output can be encoded in one qubit, termed an action qubit herein. In some implementations, this encoding can be accomplished based on entanglement of one or more qubits, with qubits that are not being sampled, still able to maintain data that can influence other, sampled qubits.

Thus, based on this correlation by quantum entanglement, the action qubits that are not being measured can influence the measurements performed on the action qubits that are measured. In one or more embodiments, this interference can further facilitate the improvement of the optimality of policy 250 with fewer interactions with the environment than in a classical setting.

As discussed further below with FIGS. 3A-B, in one or more embodiments, the one or more action qubits described above can be sampled and actions can be output in accordance with the probability distribution, according to the determined probabilities.

Figure 3A:
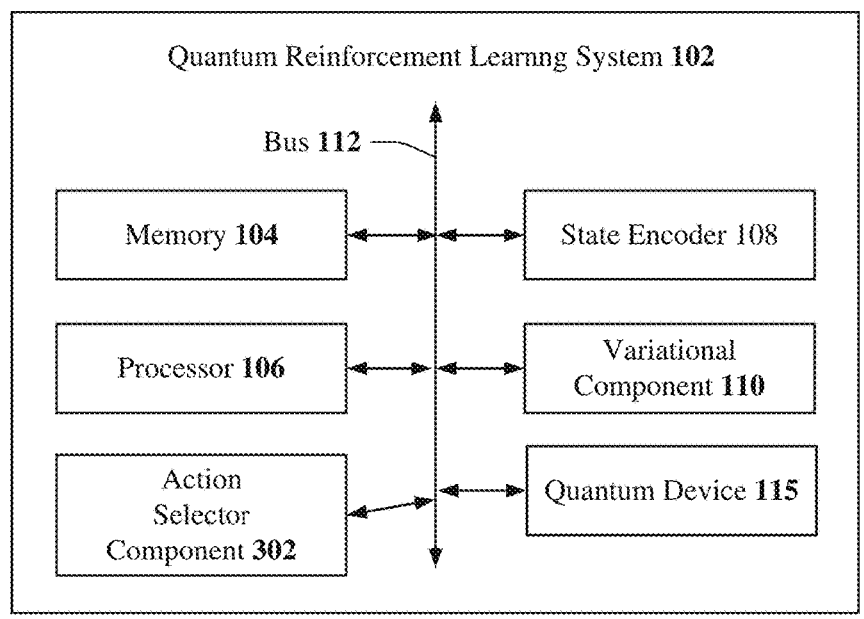
FIG. 3A illustrates a block diagram of an example, non-limiting system that can facilitate quantum reinforcement learning, in accordance with one or more embodiments described herein.

FIG. 3A illustrates a block diagram of an example, non-limiting system 300 that can facilitate quantum reinforcement learning in accordance with one or more embodiments described herein. Repetitive description of like elements and/or processes employed in respective embodiments is omitted for sake of brevity.

In some embodiments, system 300 can comprise quantum reinforcement learning system 102. In some embodiments, quantum reinforcement learning system 102 can comprise state encoder 108, variational component 110, quantum device 115, action selector component 302, and any other components associated with quantum reinforcement learning system 102 as disclosed herein.

In one or more embodiments, reinforcement learning system 102 can facilitate performance of operations executed by and/or associated with action selector component 302 that can select an action 220A of the plurality of available actions 220A-B based on a sampling of one or more qubits storing the probability distribution, resulting in a selected action. In one or more embodiments, the sampling of the one or more qubits can comprise sampling a subset of the one or more qubits based on a quantum entanglement of a pair of the one or more qubits, e.g., in an example where a probability distribution for four available actions is encoded in two qubits (e.g., $\log_2(4\text{ actions})$), based on an interrelationship of results in both qubits (e.g., but entanglement), when results are sampled, subset of the complete number of qubits can be used, e.g., one of the two qubits.

Figure 3B:
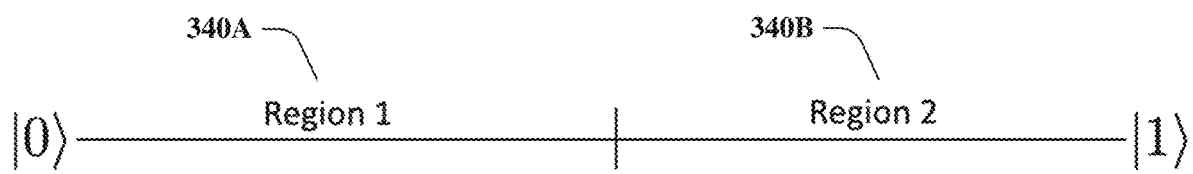
FIG. 3B illustrates a line representing a continuous state of values that can be stored in a qubit, upon which available actions can be evaluated based on the probability distribution generated by variational component, in accordance with one or more embodiments.

FIG. 3B illustrates a line 350 representing a non-limiting example of a continuous state of values that can be stored in a qubit, upon which available actions can be evaluated based on the probability distribution generated by variational component 110, in accordance with one or more embodiments. Repetitive description of like elements and/or processes employed in respective embodiments is omitted for sake of brevity.

It should be noted that, in the example depicted in FIGS. 3A-B, a quantum reinforcement learning application operates under conditions where, at any given state, one of two actions can be selected, e.g., this is why this example uses one qubit (because $\log_2(2)=1$), and why the probability distribution on the qubit is divided into two regions. In an alternative example, when a quantum reinforcement learning application has four possible actions at any given state, two qubits can be required to read out the action probability distribution, e.g., because since $2^2=4$ actions.

Returning to the example depicted in FIGS. 3A-B, based on the state parameters stored in state qubits of quantum device 115 by state encoder 108, and the probability distribution generated and encoded in action qubits by variational component 110, in one or more embodiments, action selector component 302, can, by sampling the one or more action qubits, select from available actions in accordance with the probability of reward maximization embodied in the probability distribution. For example, if an action 220A is assigned a 70% probability for maximizing rewards and action 220B is assigned a 30% probability, then action selector component 302, when sampling the action qubits, can return output corresponding to the action 220A and action 220B, respectively, 70% and 30% of the time.

In one or more embodiments, because the number of action qubits can be equal to $\log_2 m$, the probability distribution can be written in the form $\{0:X, 1:T-X\}$ where T represents the total number of iterations, and X corresponds to the number of times the 0 state is observed (noting that since the 0 and 1 states are mutually exclusive, the 1 state must be observed T–X times). Thus, with line 350 representing the number of iterations where the 0 and 1 states are observed, the output distribution will necessarily fall into one of these two regions 340A-B. By assigning each possible action 220A-B to a region, the output distribution can directly correspond to the action to be selected that is predicted to maximize cumulative rewards.

It should be noted that the results of the selected action performed can be evaluated and multiple algorithms described above can be updated to more accurately reflect the state of the environment, and the implementation of policy 250. One approach to measuring results used by one or more embodiments of reinforcement learning system 102, uses results evaluator 502, described with FIGS. 4-5 below. Further, as discussed in FIG. 6, the algorithms noted above can be updated by parameter updater 615, in accordance with one or more embodiments.

Figure 4:
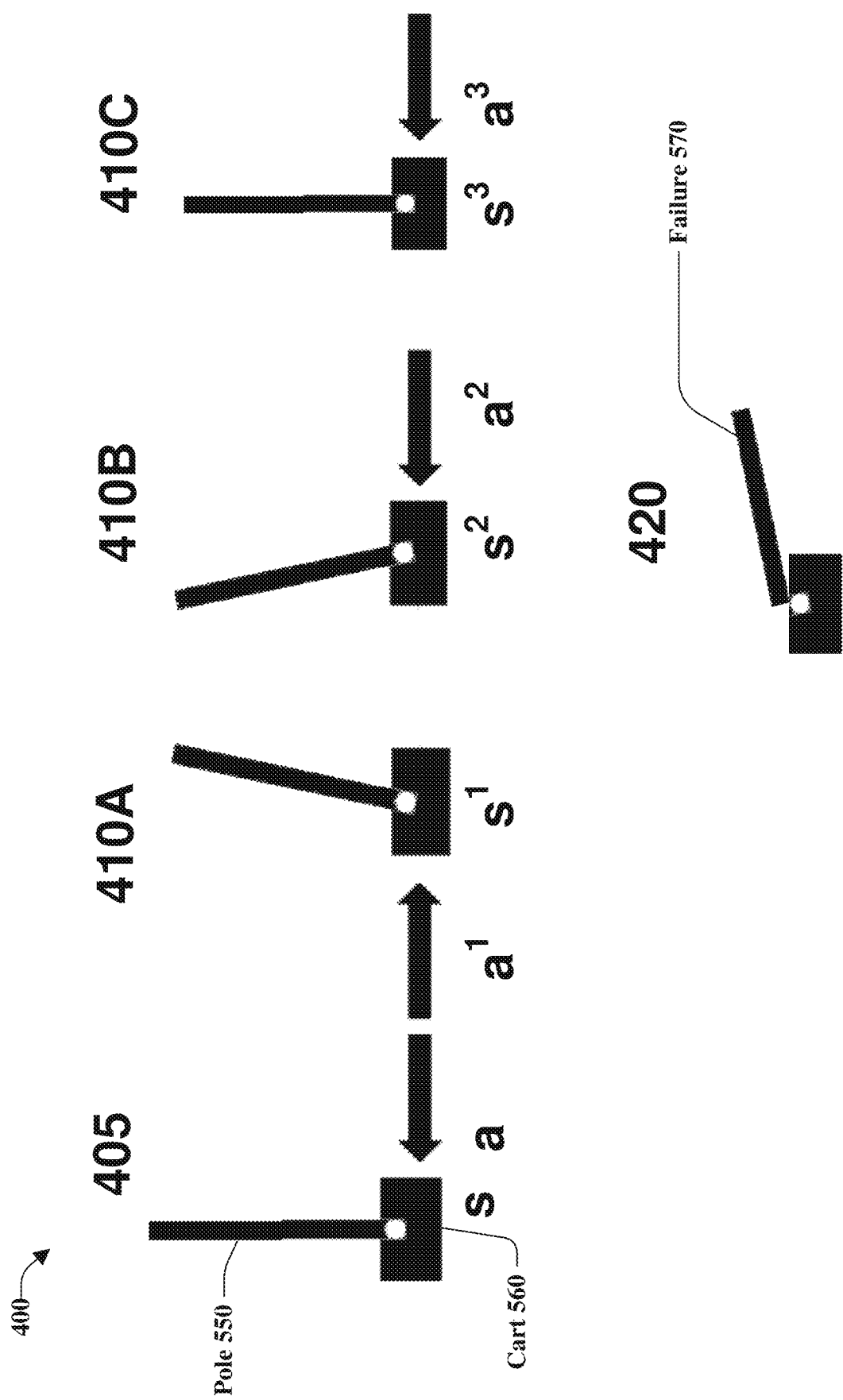
FIG. 4 illustrates an application of one or more embodiments where a cart upon which a pole is balancing can be manipulated by one or more embodiments.
Figure 5:
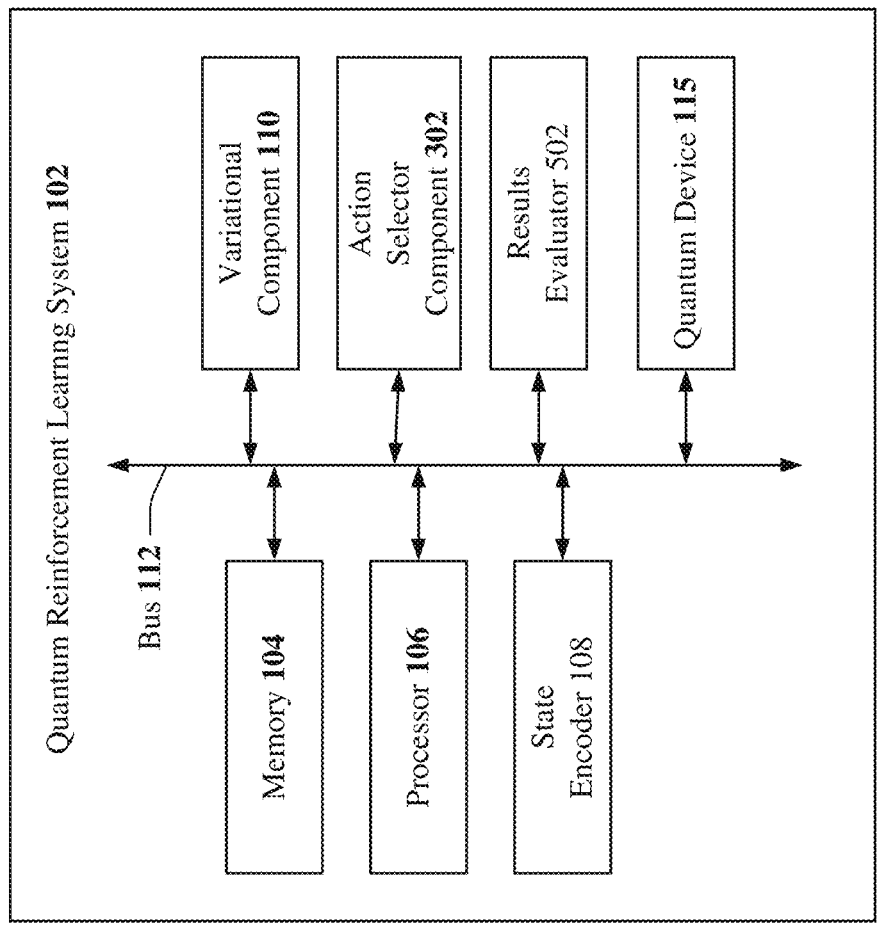
FIG. 5 illustrates a block diagram of an example, non-limiting system that can facilitate quantum reinforcement learning, in accordance with one or more embodiments described herein.

FIGS. 4-5 provide an example of how one or more embodiments can apply reinforcement learning provide autonomous control of a device in a continuous state space using approaches described herein. FIG. 4 illustrates an application of one or more embodiments where a cart upon which a pole is balancing can be manipulated by one or more embodiments. Repetitive description of like elements and/or processes employed in respective embodiments is omitted for sake of brevity.

In this example, cart 560 can be moved right or left to balance pole 550, and the objective is to avoid failure 570, e.g., pole 550 falling below a critical angle or cart 560 hitting the end of a defined track (not shown). Return can be maximized by avoiding failure as long as possible. In this example, reinforcement learning system 102 can use reinforcement learning for autonomous control of cart 560 in an environment that can be described by continuously updated state parameters described below.

In this example, the state of the environment can be parameterized by four example state parameters, including, a position of cart 560 on a track, a velocity of cart 560 moving on the track, an angle of pole 550 on cart 560, and a velocity of the top of pole 550 on cart 560. It should be noted different numbers of state parameters, and different state parameters, can be selected to achieve this objective. As described above, in one or more embodiments state encoder 108 of reinforcement learning system 102 can be used to encode values of the above state parameters in one or more state qubits. In this example, as described above, each state parameter can be encoded in a state qubit.

As noted above, one or more embodiments can utilize different quantum-mechanical phenomena to improve the storage of the above-noted state parameters. In an example, a relationship between such that a stored parameter can affect the values of one or more other stored parameters, without the application of processing resources. For example, state encoder 108 can be configured to entangle some state qubits so as to interrelate their values, e.g., because they are interrelated in the environment and could be useful to improve the maximization of rewards based on the policy. Thus, based on this entanglement, a stored parameter can affect the values of one or more other stored parameters, without the application of processing resources, beyond the entangling gates described above. In an example, the relative position of the base of cart 560 to the top of the pole 550 can be important to avoiding failure 570. Based on this, state encoder 108 can entangle the state qubits for these state parameters such that this relative position can be easily determined and used to evaluate the cumulative awards of different actions.

In an alternative embodiment, the above factor if the relative position of the base of cart 560 to the top of the pole 550 is not known to be relevant to achieving the objective but the analysis of the state variables over time can implicitly reveal interdependencies of the state parameters and suggest how parameters can be manipulated to select an action. Further, to implement the discovered relationships between state parameters shown in the sampling of state qubits, in one or more embodiments during analysis by variational component 110, policy parameters used by variational component 110 can automatically update the entanglement among the state qubits to implement the discovered relationships.

Continuing this example, as selected, there are two available actions that can be applied to the environment to maximize rewards based on the policy, e.g., push left, push right. Further, in this example, rewards can be maximized by avoiding failure for as long as possible. Based on one or more variational parameters that can be used to determine a predicted maximum cumulative reward of pushing either right or left on cart 560, one or more embodiments can generate a probability distribution for pushing left or right on cart 560. For example, at 405, pole 550 has a state (s) to be used for selection of an action (a).

Based on the $\log_2$ of the number of available actions, as described above, variational component 110 can output a determined probability distribution on one qubit. Further, action selector component 302 can use this probability distribution to select whether to push left or right, based on the current state. In 405, action (a) is selected to push left on cart 560, after an assessment of the cumulative rewards from moving from $S_1$-$S_3$ for both the push left action (s) and the push right action (a). The process of selecting actions and evaluating potential cumulative rewards can continue until failure 420, with results evaluator 502 discussed with FIG. 5 evaluating actual results of performed actions, and with parameter updater 615 updating aspects that can include, but are not limited to, the algorithm used by state encoder 108 to capture the values of state parameters, and the parameters that determine how variational component 110 evaluates whether to push left or right on cart 560 based on the policy of not failing.

FIG. 5 illustrates a diagram of an example, non-limiting system 500 that can facilitate quantum reinforcement learning in accordance with one or more embodiments described herein. Repetitive description of like elements and/or processes employed in respective embodiments is omitted for sake of brevity.

In some embodiments, system 500 can comprise quantum reinforcement learning system 102. In some embodiments, quantum reinforcement learning system 102 can comprise state encoder 108, variational component 110, quantum device 115, action selector component 302, results evaluator 502, and any other components associated with quantum reinforcement learning system 102 as disclosed herein.

After an iteration of action selection, results evaluator 502 can facilitate system updates by evaluating the cumulative rewards discovered after the selected action was taken.

With respect to approaches to action selection based on cumulative rewards, it should be noted that one approach to achieving an optimal policy is to maximize the cumulative rewards encountered throughout iterations of action evaluation, action selection, and results evaluation, by taking the actions that would, in expectation, yield the greatest value. Mathematically stated, the maximization of value, V, at a state s (over the policy (θ)) could be achieved through gradient ascent over:

$$\nabla_\theta V_\theta(s) = \sum_a \sum_{s'} p_\theta(s' \mid a, s) \, (r_{s,a,s'} + V_\theta(s'))  \quad \text{Equation \#1}$$

However, because of the continuous discovery of rewards by one or more embodiments, each of the reward values are not known until a playthrough of actions from an initial state 405 until failure 420. Consequently, in contrast to the above Equation #1, in one or more embodiments, for each state-action-state' (s,a,s') transition pair experienced (during an episode), and the cumulative reward discovered thereafter by results evaluator 502, the current policy (θ) may be updated with:

$$\theta = \theta + \nabla_\theta \log(p_\theta(s' \mid a, s) G_{s,a}) \quad \text{Equation \#2}$$

Thus, in one or more embodiments, the above Equation #2 can be used by results evaluator 502 to update different aspects of reinforcement learning system 102 to assess a cumulative reward as iterations of action selection are performed. This is another example of one or more embodiments using quantum mechanics to improve approaches to reinforcement learning.

Figure 6:
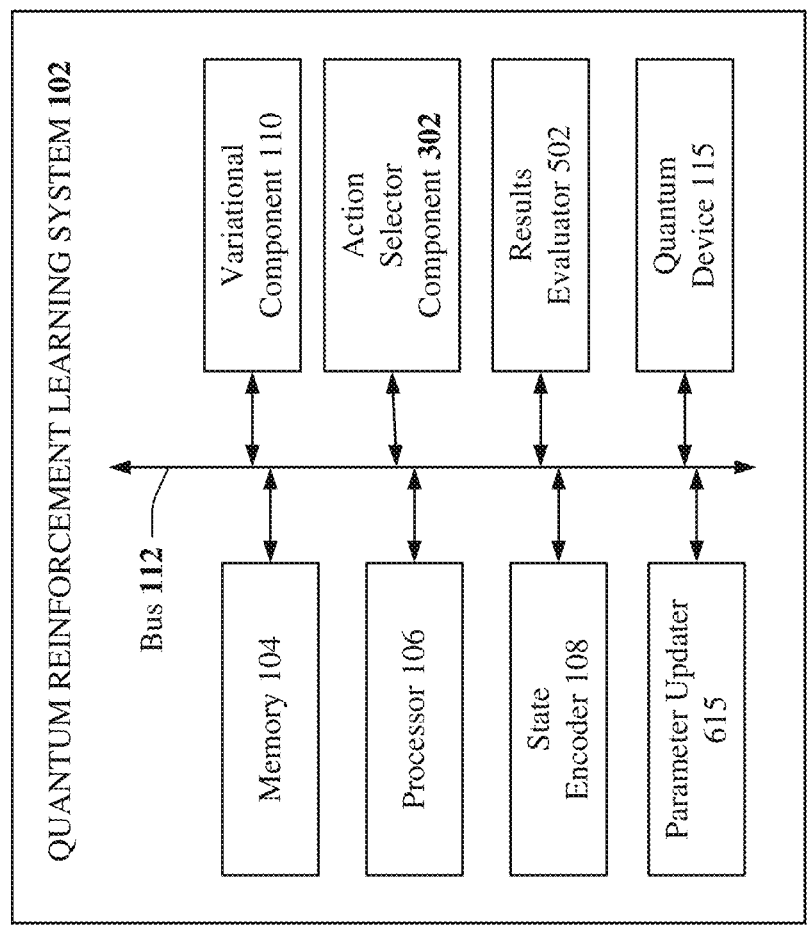
FIG. 6 illustrates a block diagram of an example, non-limiting system that can facilitate quantum reinforcement learning, in accordance with one or more embodiments described herein.

FIG. 6 illustrates a diagram of an example, non-limiting system 600 that can facilitate quantum reinforcement learning in accordance with one or more embodiments described herein. Repetitive description of like elements and/or processes employed in respective embodiments is omitted for sake of brevity.

In some embodiments, system 600 can comprise quantum reinforcement learning system 102. In some embodiments, quantum reinforcement learning system 102 can comprise state encoder 108, variational component 110, quantum device 115, action selector component 302, results evaluator 502, parameter updater 615, and any other components associated with quantum reinforcement learning system 102 as disclosed herein.

As iterations of reinforcement learning system 102 proceed from initial state 405 to failure 420, the one or more encoding parameters of the state encoder 108 can be updated such that state encoder 108 can learn the best way to map the continuous state parameters. For example, when measuring a state parameter that corresponds to the velocity of the top of pole 550, state encoder can have one or more encoding parameters that do not accurately measure this state parameter. This reduction of accuracy can correspondingly reduce the accuracy of reward predictions. Updating the one or more encoding parameters by parameter updater 615 can thus improve the performance of variational component 110 and action selector component 302.

Additionally, in one or more embodiments, one or more variational parameters used by variational component 110 to evaluate the potential cumulative rewards for the policy of available actions can be updated over iterations such that variational component 110 learns the optimal mapping to perform, given the continuous variables describing the environment's state and the applied policy.

Figure 7:
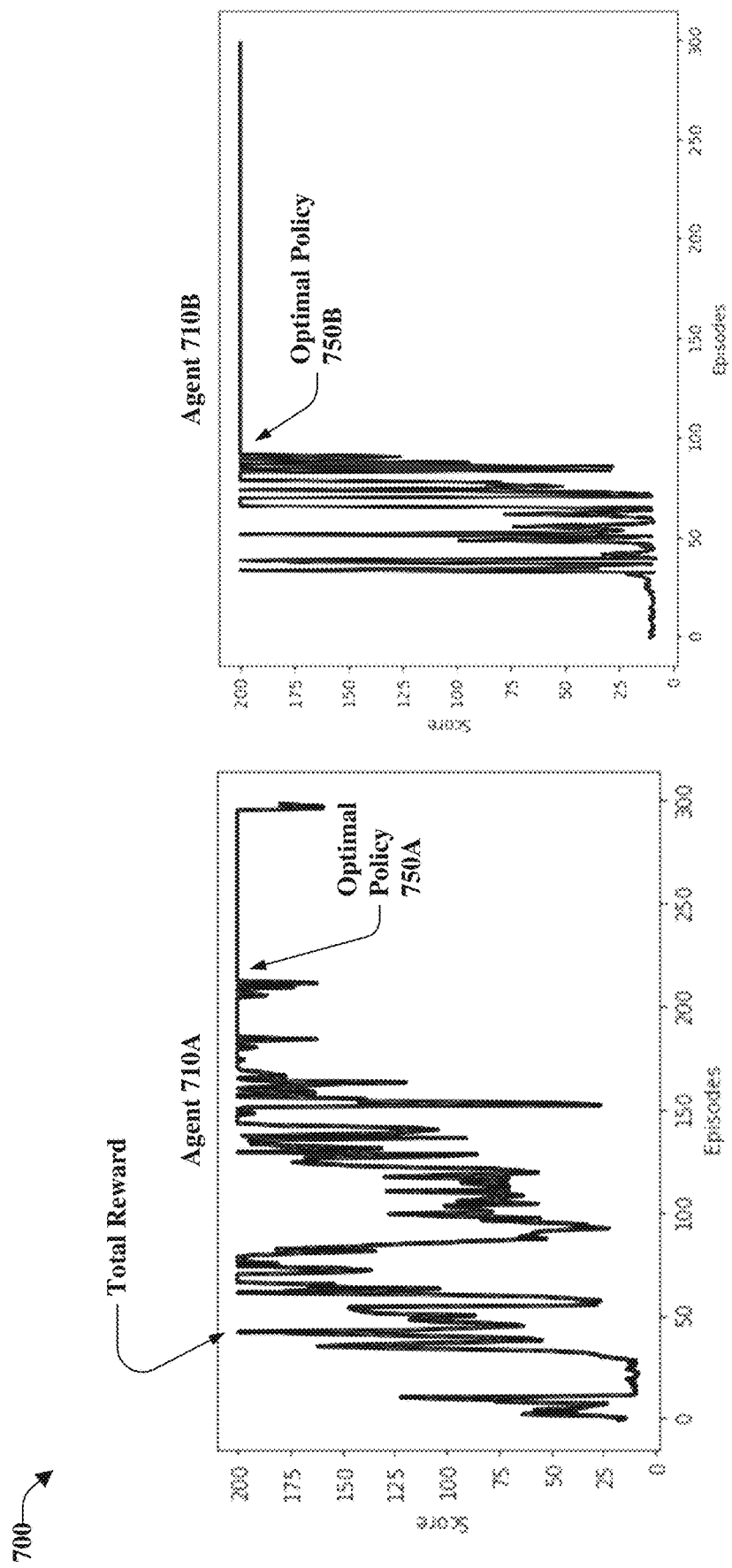
FIG. 7 charts example results of approaches that can be used by different implementations of reinforcement learning agents, in accordance with one or more embodiments described herein.

FIG. 7 charts example results of approaches that can be used by different implementations of reinforcement learning agents, in accordance with one or more embodiments described herein. Repetitive description of like elements and/or processes employed in respective embodiments is omitted for sake of brevity.

This figure depicts charts for agents 710A-B, depicting the progress both agents make over time converging on an optimal result. In these example results, agent 710A depicts results of one or more embodiments of quantum reinforcement learning system 102 and agent 710B depicts example results of a classical non-quantum approach.

In an example comparing these charts, point 750B, highlighting the point an optimal policy is determined by agent 710B, can be compared to similar point 750A for agent 710A. Based on the significantly faster time to optimality achieved by one or more embodiments (e.g., respectively 220 episodes compared to approximately 100 episodes for the one or more embodiments depicted in the chart for agent 710A. Based at least on the above, the experiment supports use of quantum circuits with entanglement to facilitate enabling the quantum reinforcement learning algorithm to converge to the optimal policy faster than the equivalent classical reinforcement learning algorithm. That is, entanglement from qubits that are not being measured can beneficially influence the measurements performed on the qubits that are measured, thus allowing, in some circumstances, an optimal policy to be discerned with fewer interactions with the environment than in a classical setting.

Features of one or more embodiments that can potentially cause the performance gains depicted in the charts include, but are not limited to, entanglement during encoding of state and action parameters, and superposition allowing continuous ranges of data to be encoded in qubits. Particularly, in some implementations of the embodiments discussed with FIGS. 1-6, correlation introduced via entanglement in the variational form, depending on multiple, continuous state parameters, and used to generate the output distribution on a subset of the qubits in the system, can facilitate substantial increases in the learning rate as compared to other approaches.

An additional quantum-mechanical feature that can improve the performance of some embodiments is the inherent potential for randomness and error in quantum computing processing and data storage. Many times, these aspects of quantum computing can cause problems with these activities, but in one or more embodiments described herein, these aspects can be harnessed to improve the operation of the reinforcement learning approaches of one or more embodiments.

For example, one of the benefits of reinforcement learning is the targeted use and evaluation of less preferred (often random) actions for implementing a policy. In one or more embodiments, randomness, interference, decoherence, and other quantum computing challenges can, in some circumstances accelerate the iterative progress towards optimal policies by causing random results at all parts of the process, including, but not limited to, encoding data, reading data, developing variational alternatives, assessing cumulative rewards, and selecting from alternative actions. While introducing such randomness in classical implementations would cause use of extra processing resources, in quantum reinforcement learning, these can occur naturally.

In some embodiments, quantum reinforcement learning system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. In some embodiments, quantum reinforcement learning system 102 and/or components thereof, can be employed to solve new problems that arise through advancements in technologies mentioned above, employment of quantum computing systems, cloud computing systems, computer architecture, and/or another technology.

It is to be appreciated that quantum reinforcement learning system 102 can utilize various combinations of electrical components, mechanical components, and circuitry that cannot be replicated in the mind of a human or performed by a human, as the various operations that can be executed by quantum reinforcement learning system 102 and/or components thereof as described herein are operations that are greater than the capability of a human mind. For instance, the amount of data processed, the speed of processing such data, or the types of data processed by quantum reinforcement learning system 102 over a certain period of time can be greater, faster, or different than the amount, speed, or data type that can be processed by a human mind over the same period of time.

According to several embodiments, quantum reinforcement learning system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that quantum reinforcement learning system 102 can include information that is impossible to obtain manually by an entity, such as a human user. For example, the type, amount, and/or variety of information included in quantum reinforcement learning system 102, state encoder 108, variational component 110, action selector component 302, results evaluator 502, parameter updater 615, and any other components associated with quantum reinforcement learning system 102 as disclosed herein, can be more complex than information able to be obtained manually by a human user.

Figure 8:
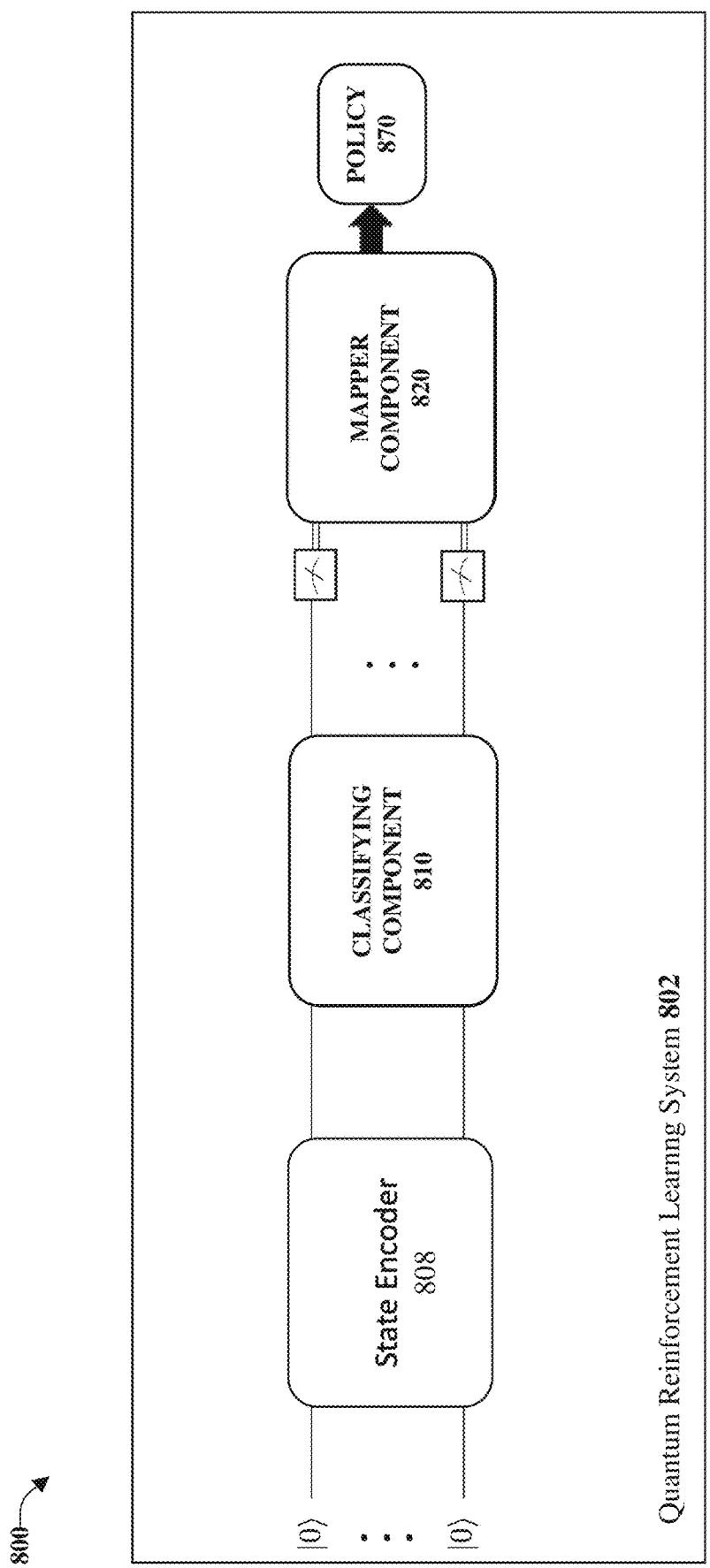
FIG. 8 illustrates a flow diagram of an example, non-limiting quantum reinforcement learning system, in accordance with one or more embodiments described herein.

FIG. 8 illustrates a flow diagram 800 of an example, non-limiting quantum reinforcement learning system 802, in accordance with one or more embodiments described herein. Repetitive description of like elements and/or processes employed in respective embodiments is omitted for sake of brevity.

Quantum reinforcement learning system 802 can include state encoder 808, classifying component 810, and mapper component 820, in accordance with one or more embodiments.

In one or more embodiments, state encoder 808 can encode, based on one or more encoding parameters, a state of an environment to span a plurality of qubits of a quantum device, resulting in a stored quantum state representation of the environment. Further, classifying component 810 can classify, based on one or more classifying parameters, the stored quantum state representation of the environment based on a sampling of one or more of the plurality of qubits, resulting in a classified state of the environment, in accordance with one or more embodiments.

It should be noted that, by storing state parameters spanned across multiple qubits, one or more embodiments can advantageously use the superposition quantum feature, e.g., by combining two superposition values, a large number of state parameter values can be stored and accessed for use.

In other aspects, this embodiment can comprise an independently working classifying component 810, that can classify data spanning multiple qubits. It should be noted that, by performing classification tasks, this embodiment can generalize the capabilities of Quantum Support Vector Machines for use with other applications.

In addition, in the embodiments discussed with FIG. 8, by encoding the parameters of the environment with a logarithmic number of qubits on the number of parameters, that embodiment can facilitate the handling of high dimensional parameter vectors by quantum machines, even in the NISQ era, e.g., being limited in the number of available qubits for use.

Returning to the quantum reinforcement learning embodiments of the present figure, once data encoded to span multiple qubits is classified by classifying component 810, this data can be mapped in one or more embodiments, by mapper component 820, on to policy 870 so as to identify probabilities to be assigned to available actions. For example, returning to FIG. 3B, line 350 can also provide an example of policy 870 for the mapping and selection features of this embodiment. In this example, state parameters of the stored quantum state representation of the environment can be classified along the range depicted on line 350, e.g., in both regions 340A-B. Once allocated in this way, in one or more embodiments, mapper component 820 can select available actions based on the relative amount of state parameter information classified in respective regions 340A-B. Stated differently, mapper component 820 can map available actions, based on a reinforcement learning policy 870, on to the classified state of the environment, e.g., classified on line 350, in accordance with one or more embodiments.

In additional embodiments, the one or more classifying parameters can include a cumulative reward value of ones of the available actions, this providing similar functions to those described with the embodiments of FIGS. 1-6, e.g., providing quantum reinforcement learning functions based on cumulative rewards of available actions. In addition, like the embodiments of FIGS. 1-6 above, results of applied actions can be used to update parameters of the system, e.g., the one or more encoding parameters and the one or more classifying parameters can be updated to facilitate incremental improvement of at least the encoding, classifying, and mapping features.

Figure 9:
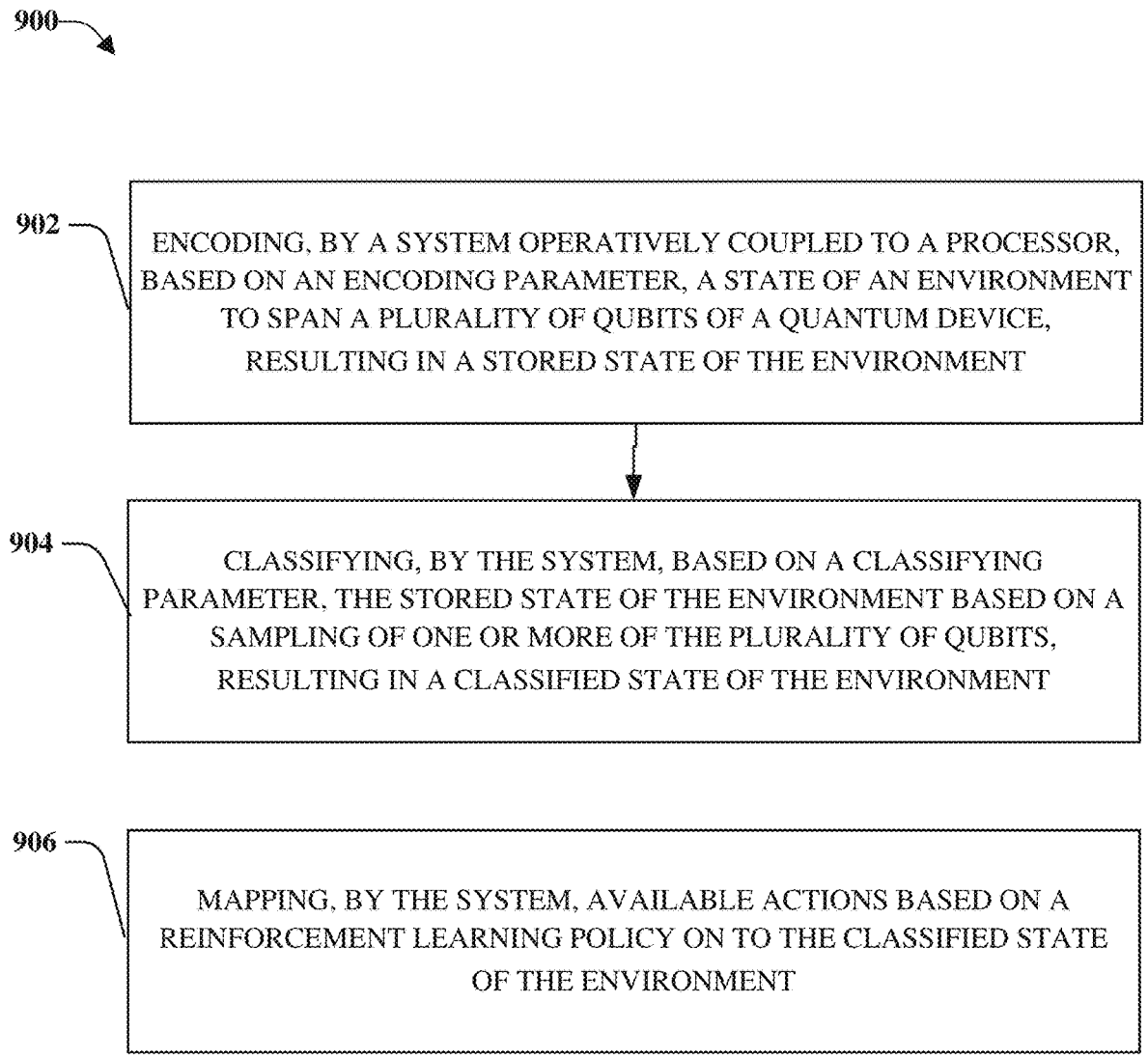
FIG. 9 illustrates a flow diagram of an example, non-limiting computer-implemented method that can facilitate quantum reinforcement learning in accordance with one or more embodiments described herein.

FIG. 9 illustrates a flow diagram of an example, non-limiting computer-implemented method 900 that can facilitate quantum reinforcement learning in accordance with one or more embodiments described herein.

At 902, method 900 can comprise encoding, by a system operatively coupled to a processor, based on one or more encoding parameters, a state of an environment to span a plurality of qubits of a quantum device, resulting in a stored quantum state representation of the environment, in accordance with one or more embodiments. For example, in an embodiment, method 900 can comprise encoding, by quantum reinforcement learning system 802 (e.g., state encoder 808) operatively coupled to a processor 160, based on one or more encoding parameters, a state of an environment (e.g., cart-pole example 400 of FIG. 4) to span a plurality of qubits of a quantum device 115, resulting in a stored quantum state representation of the environment.

At 904, method 900 can comprise, classifying, by the system, based on one or more classifying parameters, the stored quantum state representation of the environment based on a sampling of one or more of the plurality of qubits, resulting in a classified state of the environment, in accordance with one or more embodiments. For example, in an embodiment, method 900 can comprise classifying (e.g., by classifying component 810), by quantum reinforcement learning system 802, based on one or more classifying parameters, the stored quantum state representation of the environment based on a sampling of one or more of the plurality of qubits (e.g., encoded by state encoder 808), resulting in a classified state of the environment.

At 906, method 900 can comprise mapping, by the system, available actions based on a reinforcement learning policy on to the classified state of the environment, in accordance with one or more embodiments. For example, in an embodiment, method 900 can comprise mapping, by quantum reinforcement learning system 802 (e.g., by mapper component 820), available actions based on a reinforcement learning policy (e.g., mapped on to policy 870, as depicted at line 350) on to the classified state of the environment (e.g., actions can be identified based on where classified state parameters are mapped by mapper component 820).

It should be noted that, for simplicity of explanation, in some circumstances the computer-implemented methodologies are depicted and described herein as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
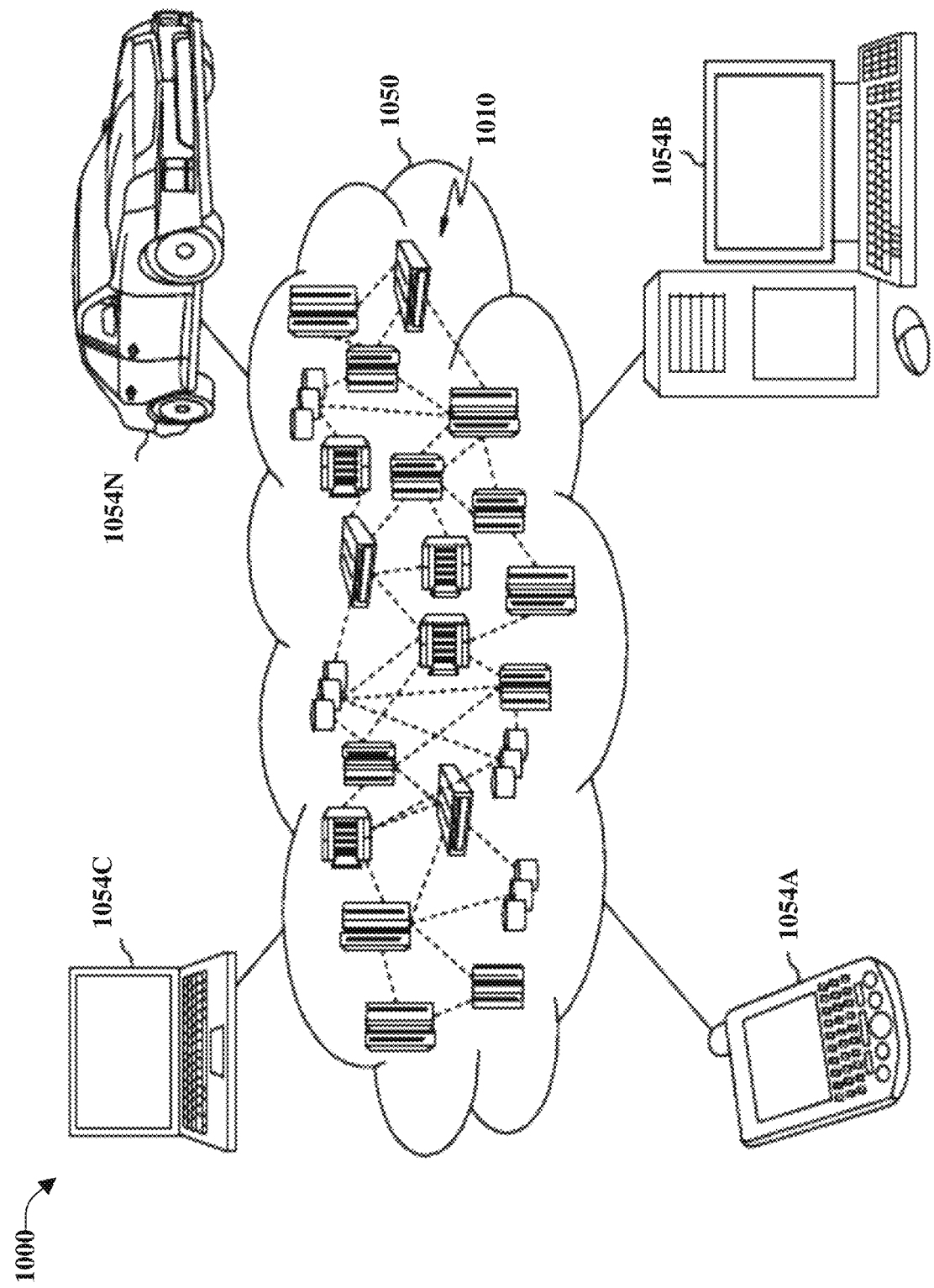
FIG. 10 depicts a cloud computing environment, in accordance with one or more embodiments described herein.

FIG. 10 depicts a non-limiting example of a cloud computing environment, in accordance with one or more embodiments. Repetitive description of like elements employed in other embodiments described herein is omitted for sake of brevity.

In some embodiments, system 100 can comprise a quantum reinforcement learning system 102, which can be associated with a cloud computing environment. For example, quantum reinforcement learning system 102 can be associated with cloud computing environment 1050 and one or more functional abstraction layers described below with reference to FIG. 11 (e.g., hardware and software layer 1160, virtualization layer 1170, management layer 1180, and/or workloads layer 1190), which can be associated with a cloud computing environment. In this example, quantum reinforcement learning system 102 and/or components thereof (e.g., state encoder 108, variational component 110, quantum device 115, action selector component 302, results evaluator 502, and any other components associated with quantum reinforcement learning system 102 as disclosed herein) can employ one or more computing resources of cloud computing environment 1150 to execute one or more operations in accordance with one or more embodiments of the subject disclosure described herein. For instance, quantum reinforcement learning system 102 and components thereof can employ one or more computing resources of cloud computing environment 1050 to execute one or more models (e.g., artificial intelligence (AI) models, machine learning (ML) models, etc.) by providing access to resource of quantum device 115, in accordance with one or more embodiments of the subject disclosure described herein.

As shown, cloud computing environment 1050 can include one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 can also communicate with one another in one or more embodiments. Nodes 1010 be grouped (not shown) physically or virtually, in one or more cloud networks, such as Private, Community, Public, or Hybrid clouds as described hereinabove, or a combination thereof. This can allow cloud computing environment 1050 to offer infrastructure, platforms and/or software as services for which a cloud consumer does not need to maintain resources on a local computing device. It is understood that the types of computing devices 1054A-N shown in FIG. 9 are intended to be illustrative only and that computing nodes 1010 and cloud computing environment 1050 can communicate with any type of computerized device over any type of network and/or network addressable connection (e.g., using a web browser).

Figure 11:
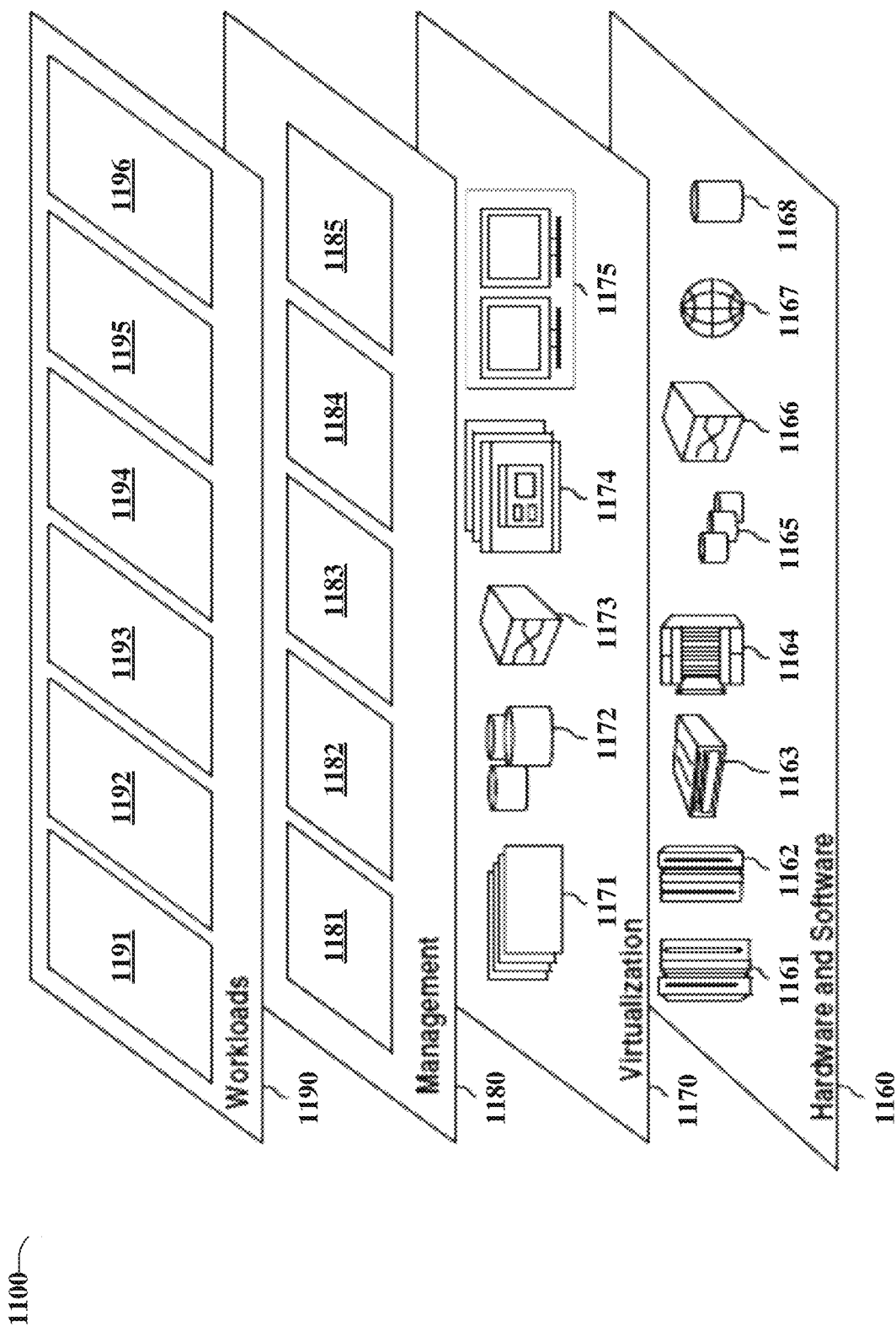
FIG. 11 depicts a non-limiting example set of functional abstraction layers provided by cloud computing environment, in accordance with one or more embodiments described herein.

FIG. 11 depicts a set of functional abstraction layers that can be provided by cloud computing environment 1050 of FIG. 10 as shown. Repetitive description of like elements and/or processes employed in respective embodiments is omitted for sake of brevity.

It should be understood in advance that the components, layers, and functions shown in FIG. 11 are intended to be illustrative only and embodiments described herein are not limited thereto. To illustrate and describe some of the functions available to cloud computing environment 1050, example layers are described below.

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 can provide an abstraction layer from which the following examples of virtual entities may be provided: virtual servers 1171, virtual storage 1172, virtual networks 1173, including virtual private networks, virtual applications and operating systems 1174, and virtual clients 1175.

In one example, management layer 1180 may provide the functions described below. Resource provisioning 1181 can provide dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security can provide identity verification for cloud consumers and tasks, as well as protection for data and other resources. User portal 1183 can provide access to the cloud computing environment for consumers and system administrators. Service level management 1184 can provide cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 can provide examples of functionality for which the cloud computing environment may be utilized. Non-limiting examples of workloads and functions which may be provided from this layer include: mapping and navigation 1191; software development and lifecycle management 1192; virtual classroom education delivery 1193; data analytics processing 1194; transaction processing 1195; and quantum reinforcement learning software 1196.

Figure 12:
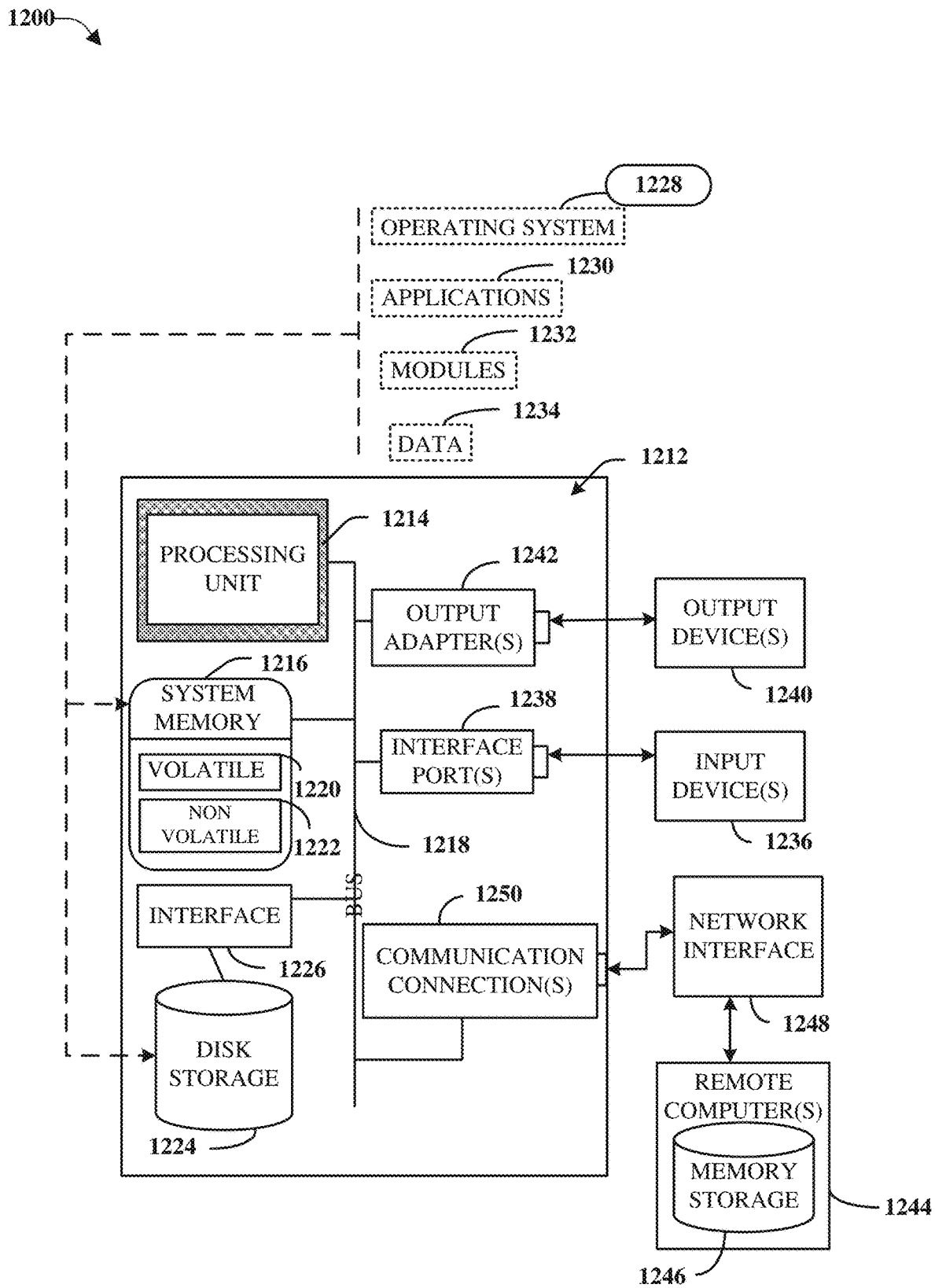
FIG. 12 illustrates a block diagram of an example, non-limiting operating environment in which one or more embodiments described herein can be facilitated.

FIG. 12 can provide a non-limiting context for the various aspects of the disclosed subject matter, intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media. To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212.

System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

One or more embodiments described herein can be a system, a method, an apparatus and/or a computer program product at any possible technical detail level of integration. The computer program product can include a computer readable storage medium (or media) having computer readable program instructions thereon for causing a processor to carry out aspects of one or more embodiment. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on one or more computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that can provide specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   encoding, by a system operatively coupled to a processor, based on one or more encoding parameters, a state of a defined environment to span a plurality of qubits of a quantum device, resulting in a stored quantum state representation of the environment, wherein the defined environment is described by one or more continuous variables; and
   classifying, by the system, based on one or more classifying parameters, the stored quantum state representation of the defined environment based on a sampling of one or more of the plurality of qubits, resulting in a classified state of the defined environment.

2. The computer-method of claim 1, further comprising, mapping, by the system, available actions, based on a reinforcement learning policy, on to the classified state of the defined environment.

3. The computer-implemented method of claim 2, wherein the one or more classifying parameters comprise a cumulative reward value of ones of the available actions.

4. The computer-implemented method of claim 3, further comprising selecting, by the system, an available action of the available actions based on the mapping of the available actions on to the classified state of the defined environment, resulting in a selected action.

5. The computer-implemented method of claim 4, further comprising:
   evaluating, by the system, the cumulative reward value of the selected action; and
   updating, by the system, at least one of, the one or more encoding parameters and the one or more classifying parameters, based on the cumulative reward value of the selected action.

6. The computer-implemented method of claim 1, wherein the encoding the state of the defined environment comprises encoding a plurality of state parameters of the state of the defined environment to span a number of the plurality of qubits of the quantum device; and wherein the number of the plurality of the qubits corresponds to a $\log_2$ of the number of the plurality of the state parameters.

\* \* \* \* \*